United States Patent
Rogatschnig et al.

(10) Patent No.: US 12,370,031 B2
(45) Date of Patent: Jul. 29, 2025

(54) BRUSH HEAD FOR AN ORAL CARE DEVICE AND METHOD OF ASSEMBLING THE SAME

(71) Applicant: KONINKLIJKE PHILIPS N.V., Eindhoven (NL)

(72) Inventors: Johann Rogatschnig, Velden (AT); Martin Varch, St. Margareten (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 372 days.

(21) Appl. No.: 17/781,794

(22) PCT Filed: Nov. 24, 2020

(86) PCT No.: PCT/EP2020/083106
§ 371 (c)(1),
(2) Date: Jun. 2, 2022

(87) PCT Pub. No.: WO2021/110464
PCT Pub. Date: Jun. 10, 2021

(65) Prior Publication Data
US 2022/0370178 A1    Nov. 24, 2022

Related U.S. Application Data

(60) Provisional application No. 62/942,771, filed on Dec. 3, 2019.

(51) Int. Cl.
*A46B 13/02* (2006.01)
*A46B 5/00* (2006.01)
(Continued)

(52) U.S. Cl.
CPC .......... *A61C 17/222* (2013.01); *A46B 5/0095* (2013.01); *A46B 9/04* (2013.01); *A46B 13/02* (2013.01); *A61C 17/34* (2013.01)

(58) Field of Classification Search
CPC .. A46B 5/00; A46B 9/04; A46B 13/02; A61C 17/322

See application file for complete search history.

(56) References Cited

U.S. PATENT DOCUMENTS 5,842,245 A * 12/1998 Pai .................. A61C 17/26
15/22.1
8,453,285 B2 * 6/2013 Dickie ............... A61C 17/222
15/22.1

(Continued)

FOREIGN PATENT DOCUMENTS

| CN | 108392288 A | 8/2018 |
| CN | 20939213 U | 9/2019 |

(Continued)

OTHER PUBLICATIONS

International Search Report and Written Opinion Dated Dec. 21, 2020 For International Application No. PCT/EP2020/083106 Filed Nov. 24, 2020.

*Primary Examiner* — Michael D Jennings

(57) ABSTRACT

A brush head (112, 212, 312, 412) for attachment to a shaft (118, 218, 318, 418) of an oral care device (400), the brush head (112, 212, 312, 412) comprising: a neck (114, 214, 314) having a working head (116, 216, 316, 416), the neck being configured to transmit oscillations from the shaft to the working head; and a spring (102, 202, 302) captive within the neck, wherein upon insertion of the shaft into the assembled brush head, the spring provides a retention force for retaining the brush head on the shaft, characterised in that the spring is in direct mechanical contact with the neck and the shaft.

11 Claims, 8 Drawing Sheets

(51) Int. Cl.
*A46B 9/04* (2006.01)
*A61C 17/22* (2006.01)
*A61C 17/34* (2006.01)

(56) References Cited

U.S. PATENT DOCUMENTS

| | | | |
|---|---|---|---|
| 10,327,876 B2 | 6/2019 | Utsch et al. | |
| 2003/0101526 A1* | 6/2003 | Hilscher | A61C 17/221 15/22.1 |
| 2005/0102773 A1* | 5/2005 | Obermann | A61C 17/3418 15/4 |
| 2005/0177962 A1 | 8/2005 | Chan | |
| 2007/0151051 A1* | 7/2007 | Filsouf | A61C 17/40 15/22.4 |
| 2010/0101032 A1 | 4/2010 | Kressner | |
| 2010/0162501 A1* | 7/2010 | Kressner | A61C 17/22 15/22.1 |
| 2010/0186179 A1* | 7/2010 | Miller | A61C 1/07 310/84 |
| 2013/0255014 A1 | 10/2013 | Kloster | |
| 2014/0259474 A1* | 9/2014 | Sokol | A61C 17/02 15/22.2 |
| 2014/0298603 A1* | 10/2014 | Hall | A46B 5/0095 15/22.1 |
| 2015/0107035 A1* | 4/2015 | Sokol | A61C 17/3418 15/22.1 |
| 2015/0150664 A1* | 6/2015 | Crossman | A61C 17/222 74/96 |
| 2018/0103751 A1* | 4/2018 | Lin | A46B 15/0036 |
| 2018/0228583 A1* | 8/2018 | Fischer | A61C 17/349 |
| 2018/0325251 A1* | 11/2018 | Lin | A46B 5/0095 |
| 2019/0015183 A1* | 1/2019 | Liu | A61C 17/3436 |
| 2019/0320788 A1* | 10/2019 | Jacobowitz | A46B 15/0036 |
| 2021/0100346 A1* | 4/2021 | Dishon | A46B 7/042 |
| 2021/0289930 A1* | 9/2021 | Wagner | A61C 17/222 |
| 2021/0386191 A1* | 12/2021 | Xu | A61C 17/221 |

FOREIGN PATENT DOCUMENTS

| | | | |
|---|---|---|---|
| EP | 2234561 B1 | 8/2012 | |
| WO | WO-2009077922 A1 * | 6/2009 | A61C 17/222 |
| WO | WO-2012085752 A1 * | 6/2012 | A61C 17/222 |

* cited by examiner

BRUSH HEAD FOR AN ORAL CARE DEVICE AND METHOD OF ASSEMBLING THE SAME

This application is the U.S. National Phase application under 35 U.S.C. § 371 of International Application No. PCT/EP2020/083106, filed on Nov. 24, 2020, which claims the benefit of U.S. application No. 62/942,771, filed Dec. 3, 2019. These applications are hereby incorporated by reference herein.

FIELD OF INVENTION

The present disclosure relates to a brush head for an oral care device and a method of assembling the same, and is particularly, although not exclusively, concerned with a brush head for an oral care device, such as an electric toothbrush, the oral care device having improved characteristics in manufacture, assembly and performance.

BACKGROUND OF THE INVENTION

Oral care devices (e.g. electric toothbrushes) often have heads that can be removed and replaced according to user requirements. Typically, these heads comprise a number of components that are fitted together during manufacture to form an assembled head. Due to the nature of the environment in which such a device is used, there is the potential for grime, residue and/or deposits (e.g. of toothpaste) to accumulate at the interfaces between these components.

Additionally, heads having a large number of components may be more costly to produce, and require more complex, time-consuming and costly manufacture and assembly.

Improvements are therefore desired in the art of removable heads for oral care devices (e.g. removable brush heads for electric toothbrushes).

FIG. 5 shows a longitudinal section through a prior art arrangement. A brush head 512, comprising a neck 514, has been inserted onto a shaft 518 of an electric toothbrush. The brush head 512 comprises a coupling piece 501 (which may also be known as a "spring carrier"), disposed within and attached to the neck 514. The brush head 512 additionally comprises a rolled spring 502, the rolled spring 502 being insertable within the coupling piece 501. The coupling piece 501 and rolled spring 502 are elongate with a substantially circular transverse cross section, the shaft 518 being received within a central recess/hollow of the coupling piece 501 such that the shaft 518, coupling piece 501 and rolled spring 502 share a common central longitudinal axis when assembled. When inserted into the coupling piece 501, the spring 502 exerts a radially compressive force on the coupling piece 501 such that the coupling piece grips onto the shaft 518, thereby retaining the brush head 512 on the shaft 518.

The coupling piece 501 and the spring 502 extend along and enclose a substantial proportion of the length and circumference of the shaft 518, such that the shaft 518 may be substantially enclosed by the coupling piece 501, and therefore does not (e.g. substantially) contact the neck 514 of the brush head 512 (e.g. for the purposes of retaining the brush head 512 on the shaft 518).

STATEMENTS OF INVENTION

According to an aspect of the present disclosure, there is provided a head (e.g. a brush head) for attachment to a shaft of an oral care device (e.g. an electric toothbrush), the head (e.g. brush head) comprising: a neck having a working head, the neck being configured to transmit oscillations from the shaft to the working head; and a spring captive within the neck, wherein upon insertion of the shaft into the assembled (brush) head, the spring provides a retention force for retaining the (brush) head on the shaft, characterised in that the spring is in direct mechanical contact (e.g. mechanical interlock) with the neck and the shaft.

The head may be a brush head. The spring may comprise a resilient key. Upon insertion of the shaft into the assembled brush head, the key may be in direct mechanical contact with the neck and the shaft, and may retain the neck on the shaft. The key may be fixed through an opening formed in the spring.

The brush head may additionally comprise an inertia ring. The inertia ring may be configured to retain the spring in the neck. The inertia ring may retain the spring in position in the neck circumferentially and/or longitudinally.

The spring may be fixed to the inertia ring. The inertia ring may be moulded onto the spring. The spring may provide fixation for an electronic sensor disposed within the neck. Upon attachment of the shaft to the brush head, the neck may abut the body of the toothbrush (e.g. directly, such as at an abutment interface).

The spring may be elongate. The spring may be substantially planar. The spring may comprise a substantially flat metal plate. The spring may be a cantilever spring, supported at one (e.g. only one) or two (e.g. both) or more ends. The spring may be fixed in position at one or both ends. The spring may not enclose the shaft in the assembled brush head.

The brush head may not require a separate coupling piece.

According to another aspect of the present disclosure, there is provided a method of assembling a brush head and attaching the brush head to a shaft of an oral care device (e.g. an electric toothbrush), the brush head comprising: a neck having a working head, the neck being configured to transmit oscillations from the shaft to the working head; and a spring captive in the neck, wherein the method comprises inserting the shaft into the neck, such that the shaft is in direct mechanical contact with the spring and the neck, the spring exerting a retaining force on the shaft and the neck such that the neck is retained on the shaft.

The method may additionally comprise attaching an inertia ring to the brush head.

The inertia ring may be integrally formed with the spring prior to assembly of the brush head (e.g. such that the inertia ring is attached to the brush head simultaneously with the spring).

The method may further comprise the step of attaching a resilient key to the spring (e.g. prior to assembly of the spring onto the brush head).

According to an aspect of the present invention, there is provided a brush head for attachment to a shaft of an oral care device (e.g. an electric toothbrush), the brush head consisting of: a neck having a working head, the neck being configured to transmit oscillations from the shaft to the working head; a spring insertable within the neck; and an inertia ring, wherein upon insertion of the shaft into the assembled brush head, the spring provides a retention force for retaining the brush head on the shaft, characterised in that the spring is in direct mechanical contact with the neck and the shaft.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

Embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

For a better understanding of the present invention, and to show more clearly how it may be carried into effect, reference will now be made, by way of example, to the accompanying drawings, in which.

DETAILED DESCRIPTION OF EMBODIMENTS

Figure 1A:
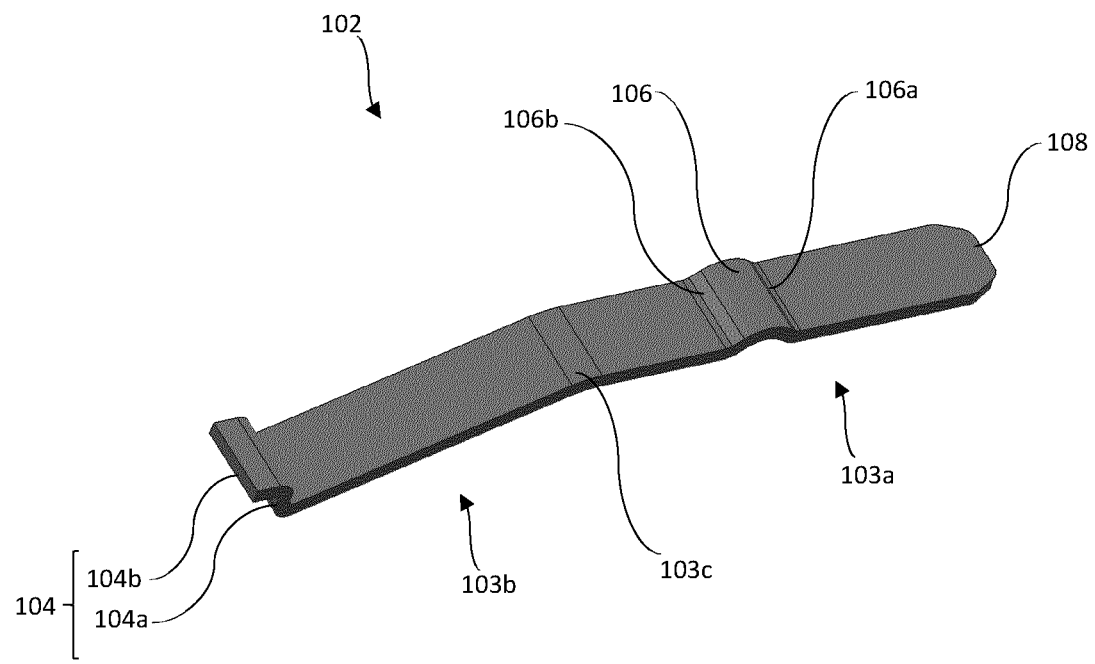
FIG. 1a shows a spring for a brush head according to a first embodiment.

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein may be used in the practice or testing of the embodiments.

Oral Care Device

Figure 4A:
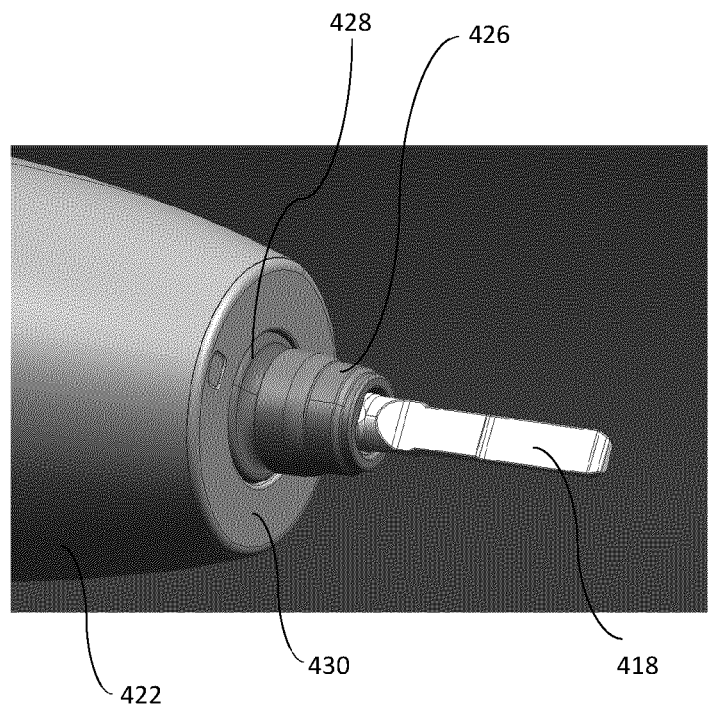
FIG. 4a is a schematic view the electric toothbrush handle.
Figure 4B:
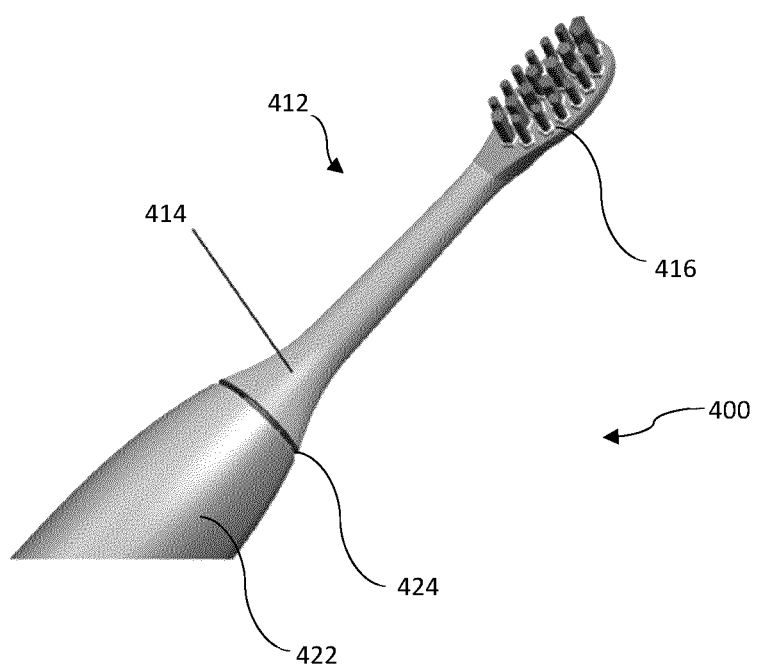
FIG. 4b shows an external view of the electric toothbrush once the assembled brush head according to the first, second and/or third embodiment has been inserted onto the shaft.

With reference to FIGS. 4a and 4b, an oral care device, which may be in the form of an electric toothbrush 400, comprises a handle 422 and a head, which may be in the form of a brush head 412. The handle 422 comprises a shaft 418 emerging (e.g. perpendicularly) from an end face 430 (e.g. along a central longitudinal axis) of the handle 422. The handle 422 may additionally comprise sealing elements 426, 428, for preventing water ingress into the toothbrush handle 422. The handle 422 may comprise an energy source such as a battery (not shown) and a motor (not shown) such that when the motor operates the shaft 418 is driven to move and may for example oscillate (e.g. rotationally between certain angles thus forming an arc of rotational oscillation) in use.

The brush head 412 comprises a working head 416 at its distal end, an opening 413 (FIGS. 1, 2 and 3) and a neck 414 disposed between the working head 416 and the opening 413. The shaft 418 is insertable within the brush head 412 such that the brush head 412 may be retained upon the shaft 418. The neck 414 is configured to transmit the oscillations of the shaft 418 to the working head 416, such that the working head 416 may oscillate in use, bristles disposed thereon thus being capable of being used for personal hygiene, such as brushing a user's teeth.

Upon full insertion of the shaft 418 inside the brush head 412, an interface 424 may be formed between an end surface 120, 220, 320 (FIGS. 1, 2, 3) of the brush head 412 and an end surface 430 of the handle 422. The brush head 412 and shaft 418 may be configured such that upon full insertion, the brush head 412 abuts the end surface 430 so there is no longitudinal clearance 424 between the brush head 412 and the end surface 430 in which grime, residue or deposits can become trapped.

Alternatively, the brush head 412 and shaft 418 may be configured such that upon full insertion, the brush head 412 does not abut the end surface 430 such that there may be clearance (e.g. longitudinal clearance) 424 between the brush head 412 and the end surface 430.

First Embodiment

Figure 1B:
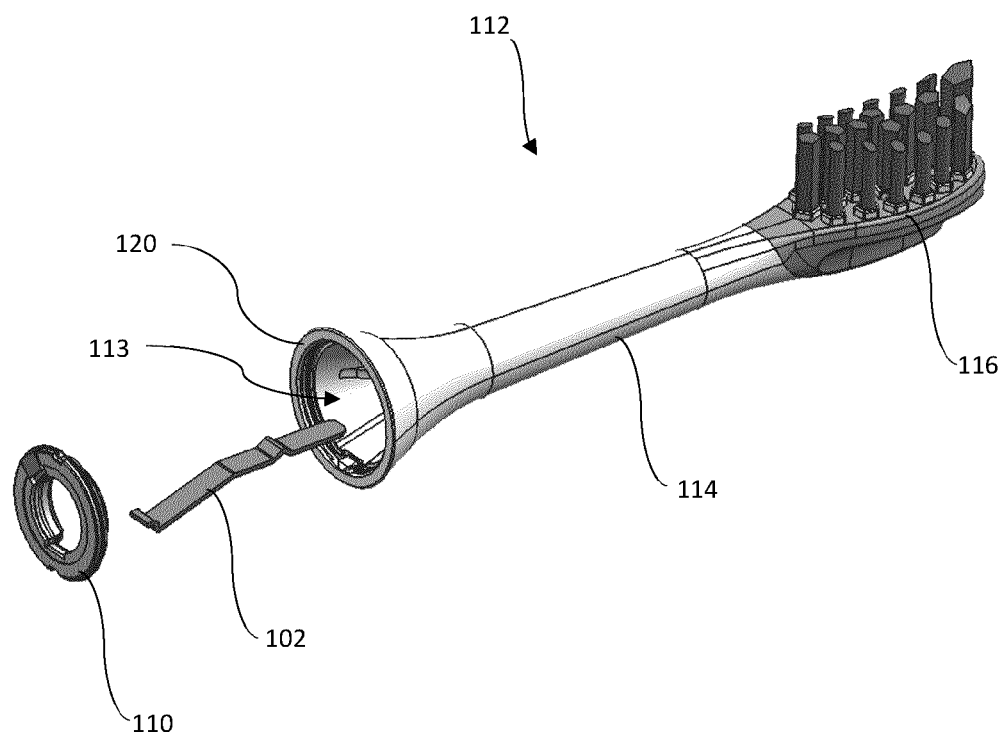
FIG. 1b shows a partially exploded view of the brush head according to the first embodiment.
Figure 1C:
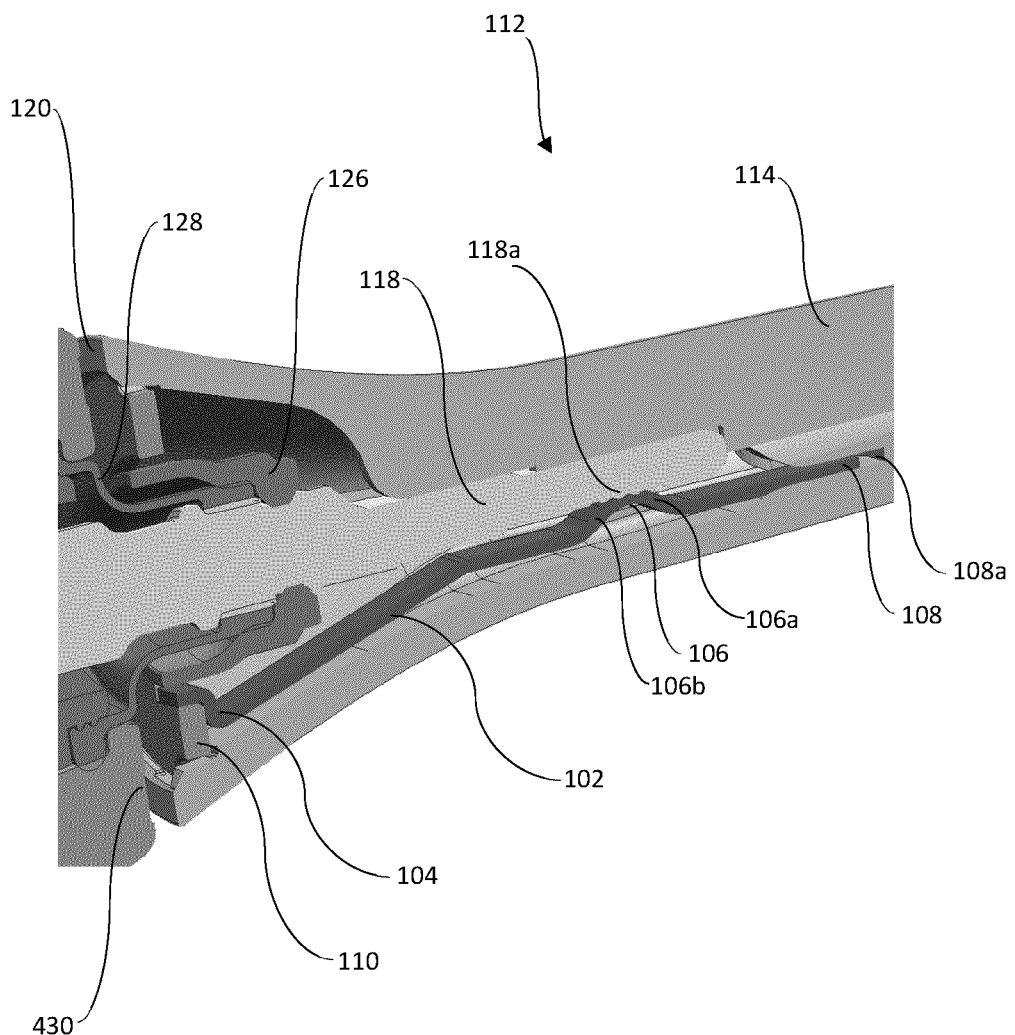
FIG. 1c is a schematic view of a longitudinal cross-section through the assembled brush head of the first embodiment having been inserted onto the shaft of the electric toothbrush.

With reference to FIGS. 1a, 1b and 1c (collectively FIG. 1) a first embodiment of a brush head 112 for an electric toothbrush 400 is shown.

The brush head 112 comprises a resiliently deformable element (e.g. a spring) 102, which is elongate. The spring 102 comprises a first substantially planar portion 103a and a second substantially planar portion 103b, the first and second planar portions 103a, 103b being joined by a bend 103c such that the two planar portions 103a, 103b are at an angle (e.g. an obtuse angle, such as approximately 160 degrees) to one another.

The first substantially planar portion 103a comprises a tip 108 at the distal end of the spring 102, whilst the second substantially planar portion 103b comprises a lip 104 at the proximal end of the spring 102.

The lip 104 comprises a first flange 104a substantially at right angles (e.g. between 70 and 110 degrees) to the second substantially planar portion 103b. The first flange 104a may additionally comprise a second flange 104b substantially at right angles to the first flange and extending away from the spring 102, such that the second flange 104b may be substantially parallel with the second substantially planar portion 103b. The lip 104 may be suitable for engaging an inertia ring 110, for example an inner circumference of an inertia ring 110.

The first substantially planar portion 103a comprises a protrusion 106 disposed part way (e.g. a third or a half of the way) along the first planar portion 103a. The protrusion 106 may be a part of the first planar portion 103a that has been displaced from the plane of the first planar portion 103a (e.g. a kink, a bend or an arc) such that there may remain a continuous surface along the length of the spring 102. The protrusion 106 may comprise a first engagement surface 106a and/or a second engagement surface 106b, suitable for engaging a corresponding engagement surface 118a of the shaft 118.

The spring 102 may be formed by pressing a flat sheet of metal using a contoured die, to produce the non-planar lip 104 and the protrusion 106, as well as the shape of the tip 108 and the bend 103c between the two planar portions 103a, 103b.

The brush head 112 comprises a neck 114 and a working head 116, the working head 116 being disposed at a distal end of the brush head 112 and comprising bristles suitable for use in personal hygiene, e.g. cleaning a user's teeth. The neck 114 may be substantially hollow towards its proximal end, such that the neck 114 comprises a recess 113 (e.g. along its central longitudinal axis) towards its proximal end, the recess 113 having an internal structure suitable for receiving the spring 102 and inertia ring 110 within the neck 114. The recess 113 within the neck 114 is additionally suitable for receiving the shaft 118 of the electric toothbrush 400. The neck 114 additionally comprises means (not shown) for transmitting the oscillations of the shaft to the working head.

The neck 114 may comprise an end surface 120 at its proximal end, the end surface 120 being substantially perpendicular to the longitudinal axis of the brush neck 114. The end surface 120 may be suitable for abutting an end surface 430 of the toothbrush handle 422. Alternatively, the end surface 120 may not abut an end surface 430 of the toothbrush handle, such that there may be clearance (e.g. longitudinal clearance) between the end surfaces 120, 430.

The neck 114 may be substantially circular in cross section, and may vary in radius along its length. The neck 114 may have largest radius at its proximal end, and may taper with distance from its proximal end. The neck 114 may comprise a central portion disposed between the proximal end and the working head 116, the central portion being of substantially constant radius.

During assembly of the brush head 112, the spring 102 may be inserted within the neck 114, such that the tip 108 of the spring 102 is received within a recess 108a of the internal structure of the neck 114 (see FIG. 1c). The tip 108 may be received in recess 108a by means of a press-fit or interference fit. In its inserted position, the spring 102 is disposed substantially against the outer wall of the recess 113. The angle at which the proximal end of the neck 114 tapers may match the angle between the first and second planar portions 103a, 103b of the spring 102. As such, in the inserted position (e.g. shown in FIG. 1c), the first planar portion 103a of the spring 102 may be configured to be disposed substantially parallel to the central longitudinal axis of the central portion of the neck 114, whilst the second planar portion 103b may sit substantially parallel with the outwardly-tapering portion of the neck 114.

Insertion of the spring 102 may be followed by insertion of the inertia ring 110. The inertia ring 110 may enhance the security of the spring 102 within the assembled brush head 112, such that during instances of the brush head 112 being repeatedly removed from and replaced on the shaft 118 during use, the spring 102 remains in place. The lip 104 of the spring 102 may engage the inertia ring 110 such that the spring is fixed within the brush head 112 The first flange 104a of the spring may engage an end face of the inertia ring, and/or the second flange 104b may engage an inner circumference of the inertia ring 110. The inertia ring 110 may be retained by means of a snap/click fit with an inner surface of the brush neck 114.

An electronic sensor and/or electronic device (not shown) may optionally be attached to, or inserted within, the brush head 112 (e.g. before or after insertion of the inertia ring).

The brush head 112 having had the spring 102 and the inertia ring 110 inserted therein may be termed the assembled brush head 112.

The assembled brush head 112 may then be attached to the toothbrush handle 422 and shaft 118 by inserting the shaft 118 coaxially with the longitudinal axis of the brush head 112, such that the shaft 118 is received within the central, longitudinal recess 113 of the neck 114. It may be evident to a user of the toothbrush that there is a correct orientation in which to insert the shaft 118 within the assembled brush head 112.

Inserting the shaft 118 within the assembled brush head 112 causes the spring 102 to deform slightly (e.g. in a radially outward direction in relation to the neck 114), such that the spring 102 exerts a retaining force upon the shaft 118. The retaining force exerted by the spring may force the shaft against the interior surface of the recess 113 (e.g. on the opposite side the recess 113 to the spring 102), such that the shaft 118 is retained between (e.g. an interior surface of) the neck 114 and the spring 102. The shaft 118 is therefore in mechanical contact and/or mechanical linkage (e.g. direct mechanical contact) with the neck 114 and the spring 102. In the fully inserted position, the engagement surface 118a of the shaft 118 engages the protrusion 106, including the protrusion surfaces 106a, 106b such that the brush head 112 and the shaft 118 are not detachable until a threshold force is reached.

The spring may additionally retain and/or provide fixation for an electronic device and/or sensor insertable within the brush head 112.

The assembled brush head 112 may be retained upon the shaft 118 of the toothbrush handle 422 by means of (e.g. solely by means of) the spring 102 and (an interior surface of) the neck 114 (e.g. no other elements of the assembled brush head 112 may retain the brush head 112 upon the shaft 118). It is noted that the shaft 118 will additionally be in mechanical contact (e.g. direct mechanical contact) with other components of the brush head 118, in order to transmit oscillations of the shaft 118 to the working head 116, however these components may not (e.g. do not) retain the brush head 112 upon the shaft 118. Once inserted within the assembled brush head 112, the shaft 118 may therefore be in direct mechanical contact with (e.g. only with) the neck 114, the spring 102 and the oscillation transmitting components (not shown). The shaft 118 may not be in (direct) mechanical contact with any other components, such as a coupling piece.

Upon insertion of the shaft 118 within the assembled brush head 112, the spring 102 may be in direct mechanical contact with the neck 114 and the shaft 118. The spring may additionally be in contact with the inertia ring 110 and/or an electronic device/sensor. The spring may not be in direct mechanical contact with any other components within the assembled brush head 112, such as a coupling piece.

Similarly, upon insertion of the shaft 118 within the assembled brush head 112, the neck 114 may be in direct mechanical contact with the shaft 118, the spring 102, the inertia ring 110 (and optionally the end surface 430 of the toothbrush handle 422). The neck 114 may not be in mechanical contact (e.g. direct mechanical contact) with any other components, such as a coupling piece.

When the toothbrush is fully assembled, such that the shaft 118 has been inserted within the assembled brush head 112, the end surface 120 of the neck 114 may abut (e.g. substantially abut) the end surface 430 of the toothbrush handle 422, as shown in FIG. 1c, such that an abutment interface is formed. As such, there may be no longitudinal clearance 424 between the end surface 120 of the neck 114 and the end surface 430 of the toothbrush handle 422 about a perimeter of the abutment interface. Alternatively, the end surface 120 of the neck 114 may not abut the end surface 430 of the toothbrush handle, such that there may be clearance (e.g. longitudinal clearance) between the end surfaces 120, 430.

The neck 114 may form a continuous outer surface (e.g. without re-entrants and/or gaps and/or spaces for gunk/grime to accumulate) about its circumference between the working head 116 and its end surface 120.

The assembled brush head 112 may consist of the working head 116, the neck 114, the means for transmitting oscillations (not shown), the recess 113 having an internal structure, the spring 102 and the inertia ring 110—i.e. the assembled brush head may comprise no further components (e.g. the assembled brush head 112 may not comprise a coupling piece).

Second Embodiment

With reference to FIGS. 2a, 2b, 2c and 2d (collectively FIG. 2), a second embodiment of a brush head for an electric toothbrush is described. The second embodiment is largely analogous to the first, except as explained below.

The brush head 212 comprises a resiliently deformable element (e.g. a spring) 202, which may be elongate. The spring 202 comprises a first substantially planar portion 203a and a second substantially planar portion 203b, the first and second planar portions 203a, 203b being joined by a bend 203c such that the two planar portions 203a, 203b are at an angle (e.g. an obtuse angle, such as approximately 160 degrees) to one another.

Rather than a lip, the second substantially planar portion 203b comprises a third substantially planar portion 203d at its proximal end, joined by means of a bend 203e such that the second and third planar portions 203b, 203d are at an angle (e.g. an obtuse angle similar to that of the angle between the first and second planar portions 203a, 203b). As such, the third substantially planar portion 203d and the second substantially planar portion 203b may be substantially parallel.

The third planar portion 203d comprises a first flange 204a and a second flange 204b, the first and second flanges 204a, 204b extending substantially at right angles (e.g. between 70 and 110 degrees) to the third planar portion 203d. The first and second flanges 204a, 204b may be angled such that the proximal end of each flange 204a, 204b extends further from the third planar portion 203d than the distal end of each flange 204a, 204b.

The second planar portion 203b comprises a third flange 204c and a fourth flange 204d extending at right angles to the second planar portion 203b, and in the same plane as the first and second flanges 204a, 204b but extending in the opposite direction (e.g. upwards rather than downwards).

As with the first embodiment, the first planar portion 203a comprises a tip 208 at its distal end and a protrusion 206 disposed part way (e.g. a third or a half of the way) along its length. The protrusion 206 may again comprise a first engagement surface 206a and/or a second engagement surface 206b, suitable for engaging a corresponding engagement surface 218a of the shaft 218.

The spring 202 may be formed by pressing a flat sheet of metal using a contoured die, to produce the three planar portions 203a, 203b, 203d, the protrusion 206, as well as the shape of the tip 208, the bends 203c, 203e and the four flanges 204a, 204b, 204c, 204d.

Figure 2A:
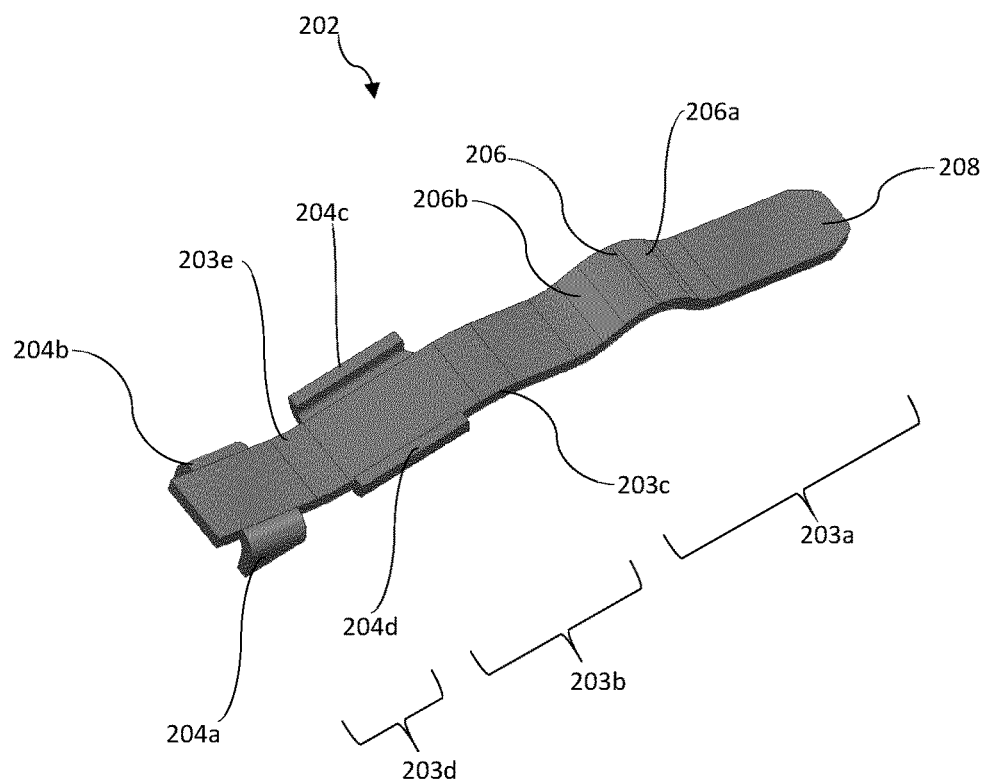
FIG. 2a shows a spring for a brush head according to a second embodiment.
Figure 2B:
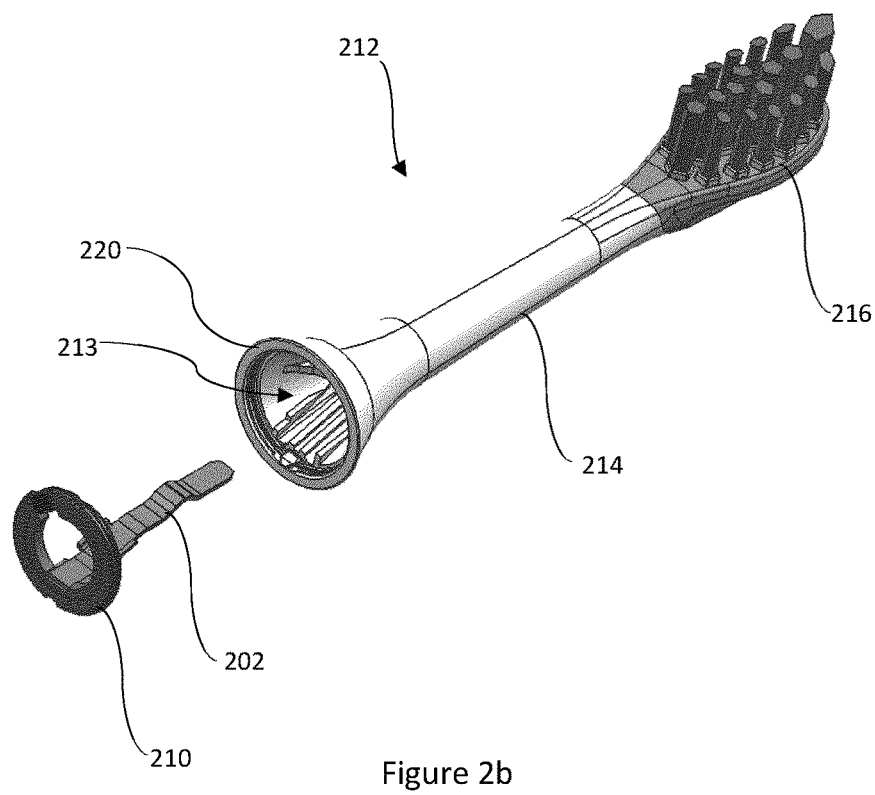
FIG. 2b shows a partially exploded view of the brush head according to the second embodiment.
Figure 2C:
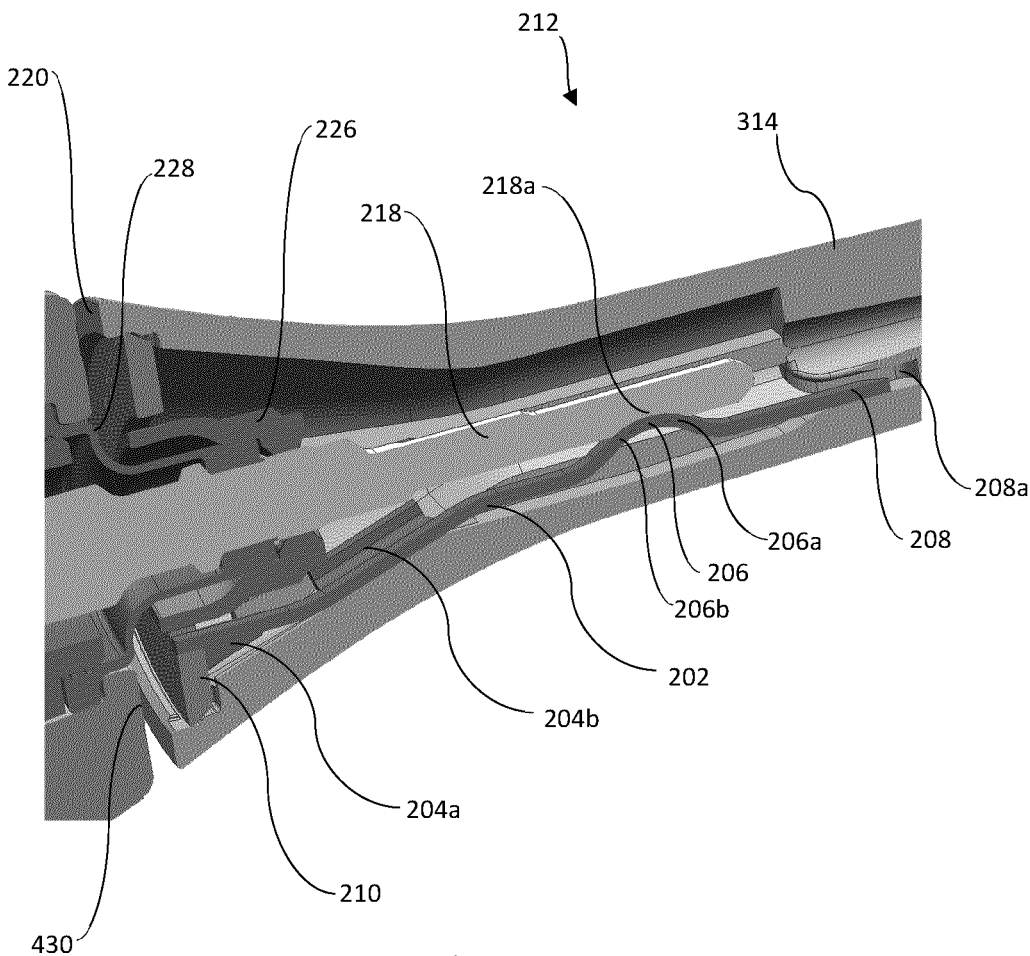
FIG. 2c is a schematic view of a longitudinal cross-section though the assembled brush head of the second embodiment having been inserted onto the shaft of the electric toothbrush.
Figure 2D:
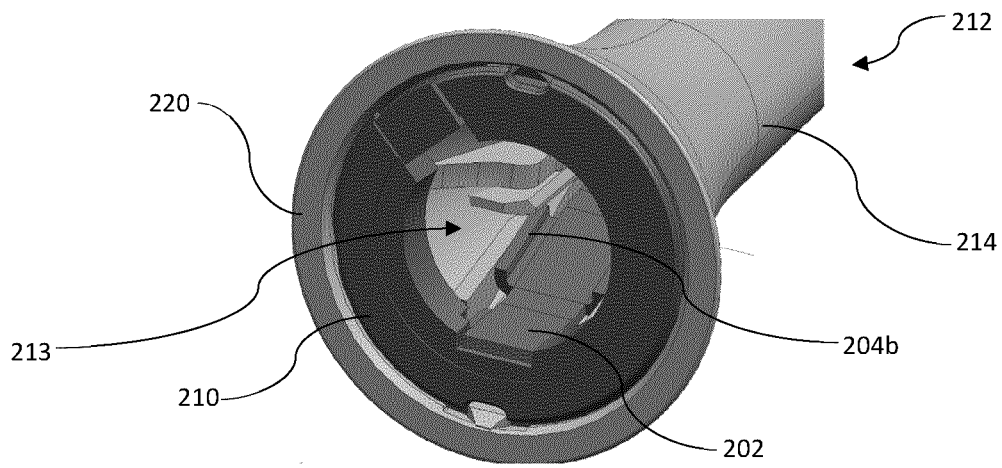
FIG. 2d shows an end view of the assembled brush head according to the second embodiment.
Figure 3A:
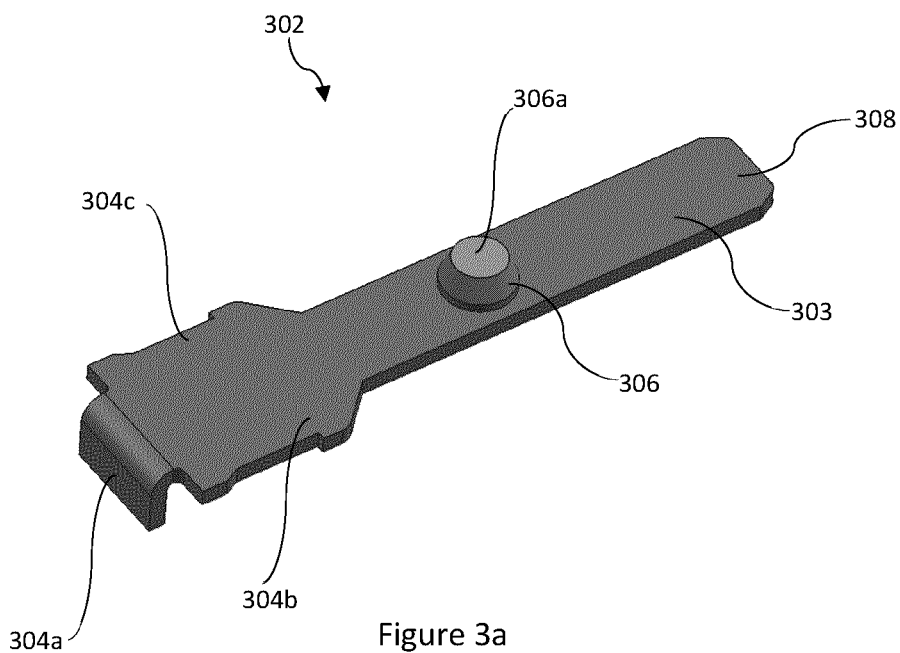
FIG. 3a shows a spring for a brush head according to a third embodiment.
Figure 3B:
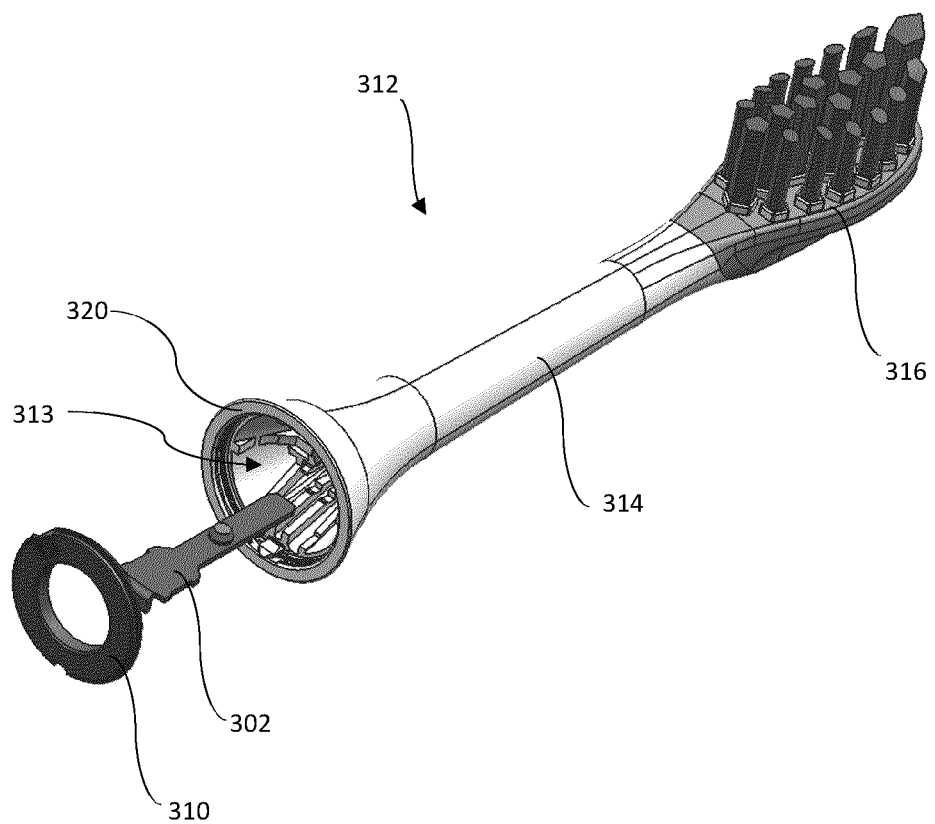
FIG. 3b shows a partially exploded view of the brush head according to the third embodiment.
Figure 3C:
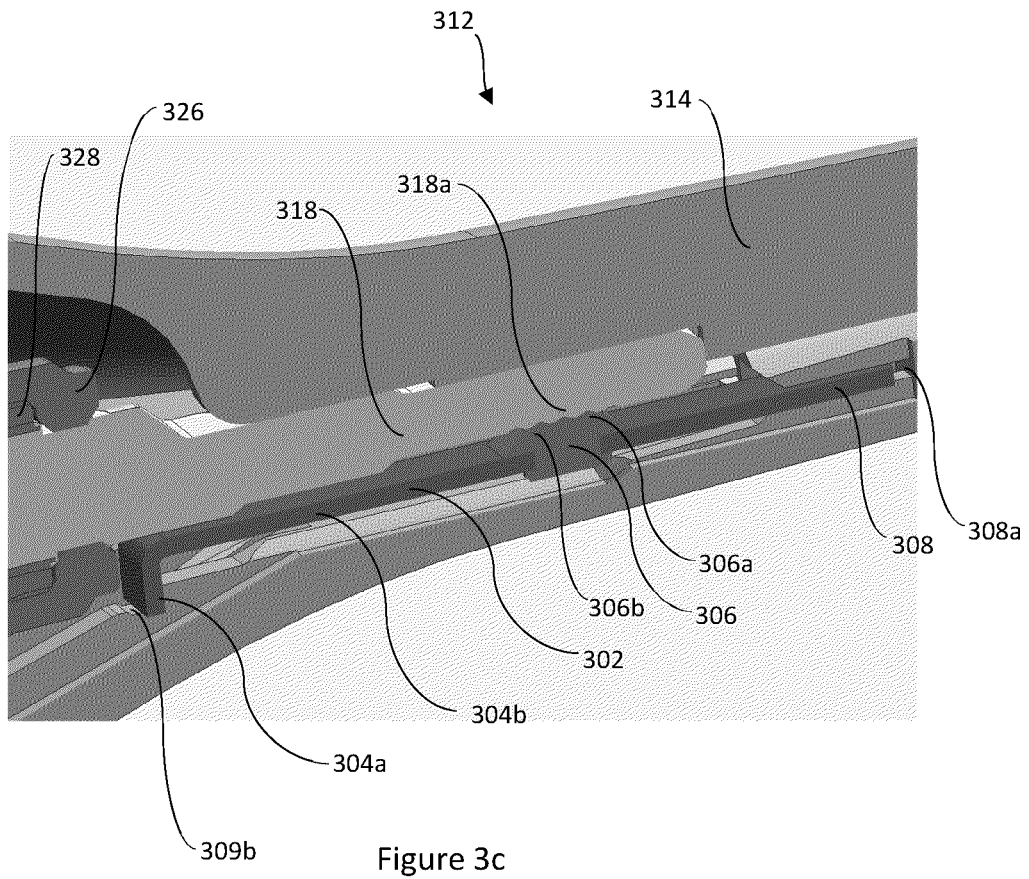
FIG. 3c is a schematic view of a longitudinal cross-section through the assembled brush head according to the third embodiment having been inserted onto the shaft of the electric toothbrush.
Figure 3D:
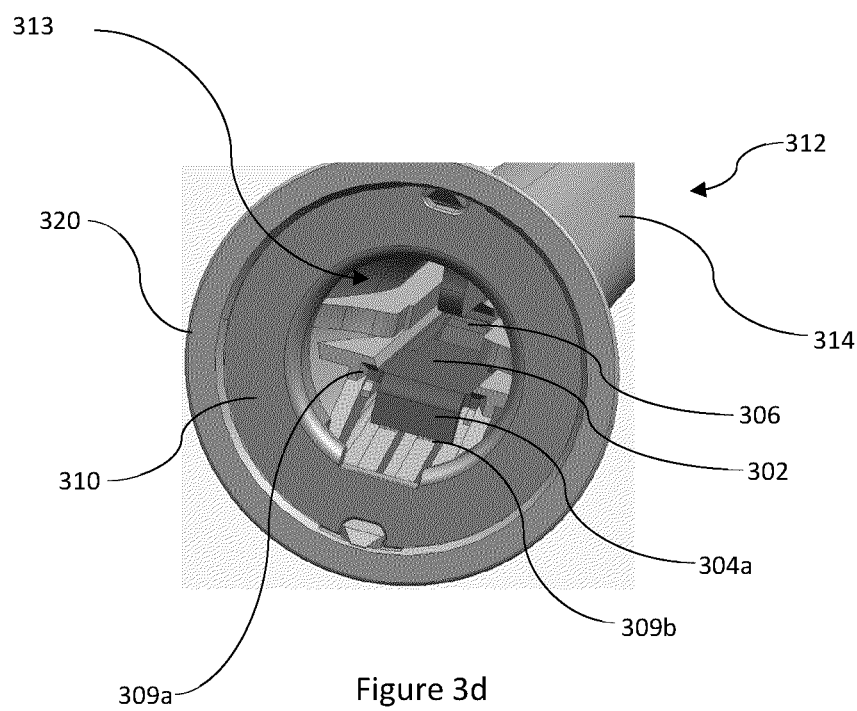
FIG. 3d shows an end view of the brush head according to the third embodiment in an assembled state.

The second embodiment differs from the first in that the spring 202 is attached (e.g. permanently attached, such as by welding) to the inertia ring 210 prior to assembly of the brush head 212. The first and second flanges 204a, 204b engage an inner circumference of the inertia ring 210 as shown in FIG. 2b, such that the inertia ring 210 and the spring 202 are rigidly attached.

The neck 214 of the brush head 212 again comprises a central recess 213 having an internal recess 208a for receipt of the tip 208 of the spring 202. The tip 208 may again be inserted into recess 208a, however the tip 208 may not be inserted into the recess 208a by means of a press-fit; instead the attachment of the inertia ring 210 to an internal surface of the neck 214 (e.g. by a click/snap fit) may be sufficient to hold the spring 202 and the inertia ring 210 in place during removal and replacement of the brush head 212 by a user.

An electronic sensor and/or electronic device (not shown) may optionally be attached to, or inserted within, the brush head 212 (e.g. before or after insertion of the inertia ring 210 and spring 202).

Upon insertion of the inertia ring 210 and the spring 202 within the neck 214 to form the assembled brush head 212, the spring is again disposed substantially parallel to the walls of the neck 214.

Upon insertion of the shaft 218 into the assembled brush head 212, the shaft interferes (e.g. directly interferes) with the spring 202 such that the spring 202 deforms slightly to allow the shaft 218 to be fully inserted within the recess 213. As the shaft is inserted within the recess 213, the deformation of the spring 202 by the shaft 218 causes the spring 202 to exert a retaining force on the shaft, forcing the shaft 218 against the inside wall of the neck 214.

The shaft is therefore in mechanical contact (e.g. direct mechanical contact) with, and retained by, the spring 202 and the inner wall of the neck 214. At maximum insertion, the engagement surface 218a of the shaft 218 engages the protrusion 206, including the surfaces 206a, 206b, such that a threshold (e.g. minimum pulling) force is required to separate (e.g. detach) the brush head 212 from the shaft 218.

The spring may additionally retain and/or provide fixation for an electronic device and/or sensor insertable within the brush head 212.

Figure 5:
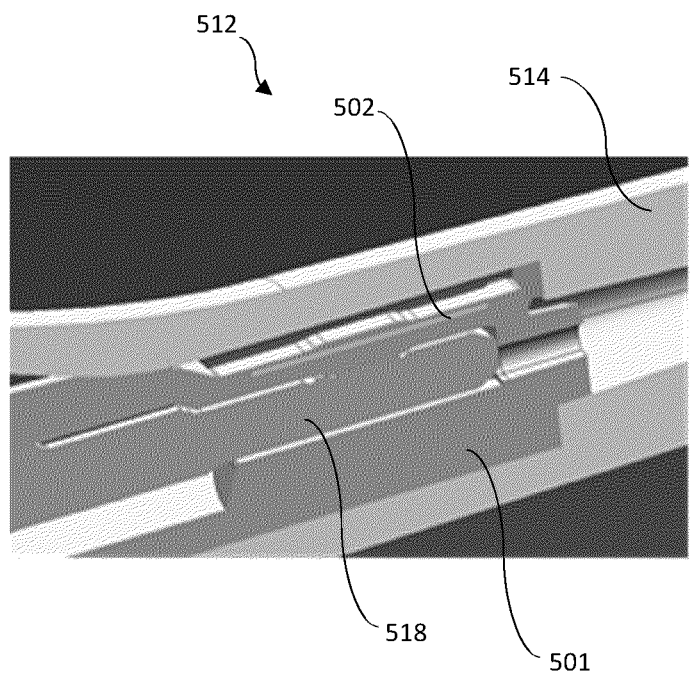
FIG. 5 shows a longitudinal cross section through a prior art arrangement.

As with the first embodiment, the shaft 218 again engages a means for transmitting its oscillations to the working head of the brush head 212, however the means for transmitting oscillations may not (e.g. does not) retain the brush head 212 upon the shaft 218. Once inserted within the assembled brush head 212, the shaft 218 may therefore be in direct mechanical contact with (e.g. only with) the neck 214, the spring 202 and the oscillation transmitting components (not shown). The shaft 218 may not be in (direct) mechanical contact with any other components, such as a coupling piece (e.g. as shown and described in relation to FIG. 5).

Similarly, upon insertion of the shaft 218 within the assembled brush head 212, the neck 214 may be in direct mechanical contact with the shaft 218, the spring 202, the inertia ring 210 (and optionally the end surface 430 of the toothbrush handle 422). The neck 214 may not be in mechanical contact (e.g. direct mechanical contact) with any other components, such as a coupling piece.

As with the first embodiment, the spring 202 is in direct mechanical contact with the neck 214 and the shaft 218 (as well as the inertia ring 210 to which it is attached and optionally an electronic device). The spring may not be in direct mechanical contact with any other components within the assembled brush head 212, such as a coupling piece. This configuration allows for a simplified, linear/sequential assembly process.

When the toothbrush 400 is fully assembled, such that the shaft 218 has been inserted within the assembled brush head 212, the end surface 220 of the neck 214 may abut (e.g. substantially abut) the end surface 430 of the toothbrush handle 422 such that an abutment interface is formed. As such, there may be no longitudinal clearance 424 between the end surface 220 of the neck 214 and the end surface 430 of the toothbrush handle 422 about a perimeter of the abutment interface. Alternatively, the end surface 220 may not (e.g. substantially may not) abut the end surface 430 of the toothbrush handle 422 such that there is clearance (e.g. longitudinal clearance) 424 between the end surfaces 220, 430.

The neck 214 may form a continuous outer surface (e.g. without entrants and/or gaps and/or spaces for gunk/grime to accumulate) about its circumference between the working head 216 and its end surface 220.

The assembled brush head 212 may consist of the working head 216, the neck 214, the means for transmitting oscillations (not shown), the recess 213 having an internal structure, the spring 202 and the inertia ring 210—i.e. the assembled brush head may comprise no further components (e.g. the assembled brush head 212 may not comprise a coupling piece).

Third Embodiment

With reference to FIGS. 3a, 3b, 3c and 3d (collectively FIG. 3), a third embodiment of a brush head for an electric toothbrush is described. The third embodiment is largely analogous to the first and second, except as explained below.

The brush head 312 comprises a resiliently deformable element (e.g. a spring) 302, which is elongate. The spring 302 is substantially planar, such that the spring 302 comprises a planar portion 303.

At its proximal end, the spring 302 comprises a flange 304a extending (e.g. in one direction) substantially at right angles to the planar portion 303. The flange 304a may be suitable for engaging a notch 309b in the interior structure of the neck 314. The spring 302 may broaden towards its proximal end by means of wing elements 304b and 304c which extend in the same plane as the planar portion 303. As is described later, the wing elements 304b, 304c may be suitable for engaging longitudinal notches 309a of the neck 414. The spring 302 additionally comprises a key 306 which protrudes from the surface of the planar portion 303 part way (e.g. a half or a third of the way) along its length, and may penetrate the full thickness of spring 302, such that the key 306 is attached to the spring 302 on both sides of the planar portion 303 of the spring 302. The protrusion 306 may extend prouder of the surface of the spring 302 on the side of the spring 302 opposite that of the flange 304a.

The key 306 may be made from a different material from the spring 302, and may be pre-attached (e.g. moulded) to the spring 302 during manufacture (e.g. the key 306 may be made of plastic and the spring 302 may be made of metal) such that the key 306 is integral to the spring 302. The key 306 comprises an engagement surface 306a suitable for engaging a corresponding engagement surface 318a on the shaft 318.

In an arrangement in which the key 306 does not substantially extend about the perimeter of the spring 302, the spring 302 may be in contact with components other than the key 306 along its length. The key 306 may be localised on the spring 302 such that the key 306 does not comprise a substantial portion of the surface area of the spring 302 (e.g. the vast majority of the surface area of the spring 302 may not be enclosed or covered by the key 306).

As with the first embodiment, at its distal end, the spring 302 comprises a tip 308, the tip 308 being receivable within a recess 308a of the neck 314. The tip 308 may be received (e.g. positioned) within, rather than secured in, recess 308a.

The spring 302 may be formed by pressing a flat sheet of metal using a contoured die, to produce the planar portion 303, the tip 308, the wing elements 304b, 304c and the flange 304a. An aperture (not shown) for receipt of the key 306 may also be formed by punching.

During assembly of the brush head 312, the spring 302 may be inserted within the neck 314, such that each of the wing elements 304b, 304c engages a longitudinal notch 309a (e.g. by means of a press fit). The notches 309a guide the spring 302 into the neck 314 such that the tip 308 of the spring 302 is received within a recess 308a and the flange 304a is received in (e.g clicked into by an interference fit)

the notch 309b. The wing elements 304b, 304c may be secured within the longitudinal notches 309a by means of a press-fit or interference fit.

In its inserted position, the spring 302 is positioned at its distal end in the recess 308a, however the tip 308 may not be received in the recess 308a by means of a press-fit. As such, the spring 302 is supported at its two ends. The central region of the spring 302 may not be supported, and as such there may be clearance between the underside of the spring 302 and the internal wall of the neck 314.

Insertion of the spring 302 may be followed by insertion of the inertia ring 310. The spring may be sufficiently securely fixed in the longitudinal notches 309a and notch 309b by means of a press-fit and/or click fit that the inertia ring 310 need not be necessary to retain the spring 310 (e.g. the inertia ring 310 may be optional). As such, the inertia ring 310 may not engage the spring 302 (e.g. the spring and inertia ring may not be in mechanical contact once the brush head 312 is assembled). Alternatively, the inertia ring 310 may engage the spring 302 for added security.

An electronic sensor and/or electronic device (not shown) may optionally be attached to, or inserted within, the brush head 312 (e.g. before or after insertion of the inertia ring).

The brush head 312 having had the spring 302 and the inertia ring 310 inserted therein may be termed the assembled brush head 312.

The assembled brush head 312 may then be attached to the toothbrush handle 422 and shaft 318 by inserting the shaft 318 coaxially with the longitudinal axis of the brush head 312, such that the shaft 318 is received within the central, longitudinal recess 313 of the neck 314.

As the shaft 318 is inserted within the neck 314, the shaft 318 may interfere with/impinge upon the spring 302 (e.g. interfere with the key 306) such that the spring 302 deflects (e.g. bows and/or deflects) downwards towards the interior wall of the neck 314 and exerts a retaining force upon the shaft 318. Once the shaft 318 has been maximally inserted inside the neck 314, the spring 302 may therefore exert a retaining force upon the shaft 318, such that the shaft 318 is forced against the interior of the neck 314 on the opposite side of the shaft 318 to the spring 302. This retaining force may be transmitted from the spring to the shaft via the key 306. The shaft 318 is therefore retained within the neck 314 of the brush head 312 by the retaining force provided by the spring 302. In this position of maximal insertion, the engagement surface 318a of the shaft 318 may engage with the engagement surface 306a of the key 306. The brush head 312 may not be removable from the shaft 318 until a minimum threshold force is reached.

The provision of a key 306 may mean that the metal of the spring 302 may not directly contact the metal of the shaft 318, thus reducing the rate of abrasion of the shaft 318 and/or the spring 302. Additionally, this may reduce the noise produced by the toothbrush during use, e.g. due to vibration, and improve the retention (e.g. gripping by friction) of the brush head 312 upon the shaft 318.

As with the first embodiment, the shaft 318 again engages a means for transmitting its oscillations to the working head 316 of the brush head 312, however the means for transmitting oscillations may not (e.g. does not) retain the brush head 312 upon the shaft 318. Once inserted within the assembled brush head 312, the shaft 318 may therefore be in direct mechanical contact with (e.g. only with) the neck 214, the spring 202 (including the key 306) and the oscillation transmitting components (not shown). The shaft 318 may not be in (direct) mechanical contact with any other components, such as a coupling piece.

Again, as with the first embodiment, upon insertion of the shaft 318 within the assembled brush head 312, the spring 302 (e.g. by virtue of the key 306) may be in direct mechanical contact with the neck 314 and the shaft 318. The spring may additionally be in contact with the inertia ring 310. The spring may not be in direct mechanical contact with any other components within the assembled brush head 312, such as a coupling piece.

Similarly, upon insertion of the shaft 318 within the assembled brush head 312, the neck 314 may be in direct mechanical contact with the shaft 318, the spring 302, the inertia ring 310 (and optionally the end surface 430 of the toothbrush handle 422). The neck 214 may not be in mechanical contact (e.g. direct mechanical contact) with any other components, such as a coupling piece.

When the toothbrush is fully assembled, such that the shaft 318 has been inserted within the assembled brush head 312, the end surface 320 of the neck 314 may abut (e.g. substantially abut) the end surface 430 of the toothbrush handle 422, such that an abutment interface (not shown) is formed. As such, there may be no longitudinal clearance 424 between the end surface 320 of the neck 314 and the end surface 430 of the toothbrush handle 422 about a perimeter of the abutment interface. Alternatively, the end surface 320 of the neck 314 may not abut the end surface 430 of the toothbrush handle 422, such that there is a (longitudinal) clearance 424 between the end surfaces 320, 430.

The neck 314 may form a continuous outer surface (e.g. without entrants and/or gaps and/or spaces for gunk/grime/residue/deposits to accumulate) about its circumference between the working head 316 and its end surface 320.

The assembled brush head 312 may consist of the working head 316, the neck 314, the means for transmitting oscillations (not shown), the recess 313 having an internal structure, the spring 302 and the inertia ring 310—i.e. the assembled brush head may comprise no further components (e.g. the assembled brush head 312 may not comprise a coupling piece).

The key 306 may prevent metal-on-metal abrasion (e.g. between the spring 302 and shaft 318), prevent the undesirable generation of excess noise, and/or achieve improved friction (and thus retention) between the spring 302 and the shaft 318 compared with metal-on-metal contact.

Advantages

It is appreciated by the present inventors that brush heads often comprise an intermediate component disposed between the spring and the shaft, which transmits a force from the spring to the shaft such that the brush head is held on the shaft. Each of the embodiments of the present invention may not comprise such an intermediate piece, which may be known in the art as a coupling piece.

The three embodiments of the present invention comprise a number of advantages over toothbrush heads known in the art.

A brush head that does not require a coupling piece reduces the number of components within the assembled brush head, thus simplifying manufacture (e.g. reducing the total number of surfaces on different components that must engage one another) and assembly (e.g. by reducing the total number of assembly and/or control steps, as well as the difficulty of each step). This may provide a cost reduction in producing the brush heads.

Without a coupling piece, the exterior surface of the neck of the brush head is able to form one continuous surface without gaps, which may previously have been present at the interface/join between the neck and the coupling piece on the exterior of the neck. The present invention thus reduces the opportunity for residue/debris/grime from the teeth-brushing process to accumulate.

It is additionally appreciated by the present inventors that a coupling piece and the neck of a brush head are often made of different materials, which may lead to differential degradation and/or wear rates, shortening the brush head's lifespan and leading to sub-optimal performance of a brush head towards the end of its life.

As the springs of the present invention are now more securely retained within the brush head, there are now fewer requirements for the inertia ring, allowing for a cheaper and simpler inertia ring construction.

Similarly, the simpler construction of the spring means it is now able to exert a retention force directly on the shaft and the neck.

A brush head having fewer components (e.g. due to the obviation of a coupling piece) thus has fewer interfaces between components. This may reduce the amount of vibration and thus noise produced by the components within the brush head.

Similarly, removal of the coupling piece may improve the retention of the brush head on the shaft, as the coupling piece does not itself comply with and/or absorb the retaining force whilst transmitting it to the shaft.

The spring 102, 202, 302 and inertia ring 110, 210, 310 designs and configurations of the first, second and third embodiments are compatible with existing designs of the external features of the brush neck. As such, the brush neck need not be redesigned, and existing tooling may be used to continue producing the brush neck. Adaptations may be required for producing the internal recess of the brush neck. The brush head of the present invention may fit to existing handles and shafts of electric toothbrushes already in use.

It is appreciated by the present inventors that in brush heads of the prior art comprising a coupling piece, the removal and replacement of a brush head upon the shaft may lead to loosening of the coupling piece within the neck of the brush head. This is undesirable (e.g. as it may lead to a user of the toothbrush having to reassemble the brush head themselves or the coupling piece no longer being able to perform its function of facilitating the brush head being retained on the shaft). This loosening may lead to a greater fall-off rate of the brush head from the shaft of the toothbrush, e.g. during use.

The above three embodiments thus form alternative solutions to the technical problem outlined in the background section of the present disclosure.

It will be appreciated by those skilled in the art that although the invention has been described by way of example, with reference to one or more exemplary examples, it is not limited to the disclosed examples and that alternative examples could be constructed without departing from the scope of the invention as defined by the appended claims. For example, whilst the present invention has been described largely in the context of an electric toothbrush and a brush head for an electric toothbrush, the skilled person will understand that the present invention may equally be applicable to other oral care devices and removable heads for other oral care devices, such as a water jet flosser. Similarly, where a "means for transmitting oscillations" to the working head is referred to, it should be construed to include any means for enabling the functioning of the head, such as the transmission of water or non-oscillatory motion.

Although only a few exemplary embodiments have been described in detail above, those skilled in the art will readily appreciate that many modifications are possible in the exemplary embodiments without materially departing from the novel teachings and advantages of the embodiments of the present disclosure. The above-described embodiments of the present invention may advantageously be used independently of any other of the embodiments or in any feasible combination with one or more others of the embodiments Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements. In a device or apparatus claim enumerating several means, several of these means may be embodied by one and the same item of hardware. The mere fact that certain measures are recited in mutually different dependent claims does not indicate that a combination of these measures cannot be used to an advantage.

The invention claimed is:

1. A brush head configured for attachment to a shaft of an oral care device, the brush head comprising:
    a neck having a working head, the neck being configured to transmit oscillations from the shaft to the working head;
    a spring captive within the neck, wherein the spring is adapted to provide a retention force for retaining the brush head on the shaft; and
    an inertia ring configured to retain the spring in the neck, wherein the spring is fixed to the inertia ring.

2. The brush head of claim 1, wherein the spring comprises a resilient key adapted to be in direct mechanical contact with the neck and the shaft.

3. The brush head of claim 2, wherein the key is fixed through an opening formed in the spring.

4. The brush head of claim 1, wherein the inertia ring retains the spring in position in the neck:
    circumferentially; and/or
    longitudinally.

5. The brush head of claim 1, wherein the inertia ring is molded onto the spring.

6. The brush head of claim 1, wherein the spring provides fixation for an electronic sensor disposed within the neck.

7. The brush head of claim 1, wherein the spring is elongate.

8. The brush head of claim 1, wherein the spring is substantially planar.

9. The brush head of claim 1, wherein the spring is fixed at one end.

10. A method of assembling a brush head and attaching the brush head to a shaft of an oral care device, the brush head comprising:
    a neck having a working head and configured to transmit oscillations from the shaft to the working head;
    a spring captive in the neck; and
    an inertia ring configured to retain the spring in the neck, wherein the spring is fixed to the inertia ring;

wherein the method comprises:
inserting the shaft into the neck, such that the spring is in direct mechanical contact with the shaft and the neck, the spring exerting a retaining force for retaining the brush head on the shaft by forcing the shaft against the neck such that the shaft is retained between the neck and the spring; and
attaching the inertia ring to the brush head.

11. The method of claim 10, further comprising the step of attaching a resilient key to the spring prior to assembly of the spring onto the brush head.

* * * * *